US012565180B2

(12) United States Patent
Diamond et al.

(10) Patent No.: US 12,565,180 B2
(45) Date of Patent: Mar. 3, 2026

(54) TRAILER BRAKE FADE RECOGNITION AND MITIGATION SYSTEM

(71) Applicant: Ford Global Technologies, LLC, Dearborn, MI (US)

(72) Inventors: Brendan Diamond, Grosse Pointe, MI (US); Keith Weston, Canton, MI (US); Stuart C. Salter, White Lake, MI (US); Kenneth Patrick McHugh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 18/425,482

(22) Filed: Jan. 29, 2024

(65) Prior Publication Data

US 2025/0242784 A1 Jul. 31, 2025

(51) Int. Cl.
*B60T 8/17* (2006.01)

(52) U.S. Cl.
CPC .................................. B60T 8/1708 (2013.01)

(58) Field of Classification Search
CPC .............................. B60T 8/1701; B60T 8/1708
See application file for complete search history.

(56) References Cited

U.S. PATENT DOCUMENTS

| | | | | |
|---|---|---|---|---|
| 4,708,225 A | * | 11/1987 | Feldman | ................. B60T 17/22 340/452 |
| 8,214,124 B2 | | 7/2012 | Kumabe et al. | |
| 8,788,176 B1 | | 7/2014 | Yopp | |

| | | | |
|---|---|---|---|
| 9,180,890 B2 | 11/2015 | Lu et al. | |
| 9,428,190 B2 | 8/2016 | Weston | |
| 9,592,800 B2 | 3/2017 | Matoy et al. | |
| 10,065,641 B2 | 9/2018 | Fraser et al. | |
| 10,207,687 B1 | 2/2019 | Shimizu et al. | |
| 10,549,732 B2 | 2/2020 | Kasper et al. | |
| 10,703,345 B2 | 7/2020 | Niedert et al. | |
| 10,767,717 B2 * | 9/2020 | Cremona | .............. B60T 8/1708 |
| 10,821,947 B2 | 11/2020 | Wijffels et al. | |
| 2003/0158648 A1 | 8/2003 | Kubota et al. | |

(Continued)

FOREIGN PATENT DOCUMENTS

WO WO-03029061 A1 * 4/2003 ............ B60T 13/662

OTHER PUBLICATIONS

Painting, Brad, "How to Calculate Brake Torque", Mar. 24, 2022, Sciencing.com.*

*Primary Examiner* — Logan M Kraft
(74) *Attorney, Agent, or Firm* — Lorne Forsythe; Price Heneveld LLP

(57) ABSTRACT

A vehicle includes a speed control system that is configured to increase and decrease vehicle speed when a command is received from a control system. The speed control system may include an engine that provides positive torque, and a friction-based system that is configured to provide negative torque to decrease vehicle speed. The control system may provide negative torque commands to activate a friction-based system of a trailer, and a trailer torque can be adjusted by changing a gain of negative torque commands to the trailer. The control system may utilize a baseline gain if trailer fade is not detected. The control system may decrease the gain of negative torque commands to the trailer if the negative torque of the trailer for an applied gain decreases with time.

16 Claims, 4 Drawing Sheets

(56) References Cited

U.S. PATENT DOCUMENTS

| | | | |
|---|---|---|---|
| 2012/0119894 | A1 | 5/2012 | Pandy |
| 2013/0138288 | A1 | 5/2013 | Nickolaou et al. |
| 2014/0100754 | A1 | 4/2014 | Schwindt |
| 2015/0353063 | A1 | 12/2015 | Tuhro et al. |
| 2016/0176403 | A1 | 6/2016 | Weston |
| 2016/0251005 | A1 | 9/2016 | Morselli et al. |
| 2018/0215358 | A1 | 8/2018 | Hall et al. |
| 2018/0339685 | A1 | 11/2018 | Hill et al. |
| 2019/0366989 | A1 | 12/2019 | James et al. |
| 2020/0062233 | A1 | 2/2020 | Yu |
| 2020/0080968 | A1 | 3/2020 | Lowry et al. |
| 2021/0139008 | A1 | 5/2021 | DiGioacchino et al. |
| 2022/0324448 | A1 | 10/2022 | Lewandowski et al. |
| 2022/0355772 | A1 | 11/2022 | Matschke et al. |
| 2022/0371588 | A1 | 11/2022 | Weston et al. |
| 2023/0110101 | A1 | 4/2023 | Lewandowski et al. |
| 2023/0150496 | A1 | 5/2023 | Barrett et al. |
| 2023/0159029 | A1 | 5/2023 | Tseng et al. |

* cited by examiner

TRAILER BRAKE FADE RECOGNITION AND MITIGATION SYSTEM

FIELD OF THE DISCLOSURE

The present disclosure generally relates to control of negative torque/speed reduction device(s) of a trailer by a towing vehicle. In particular, the system adjusts vehicle and/or trailer speed reduction requests if friction device fade of vehicle and/or trailer devices is detected.

BACKGROUND OF THE DISCLOSURE

Various types of systems to generate negative torque to reduce speed of a vehicle have been developed. Vehicles may be configured to communicate with friction-based speed reduction systems of a trailer that is being towed by the vehicle. The vehicle may be configured to generate requests or commands to the vehicle and/or the trailer to reduce speed. The commands may be adjusted or controlled utilizing a gain whereby negative torque (torque tending to reduce vehicle speed) generated by friction devices of the vehicle and/or trailer is increased or decreased when the gain is increased or decreased. Known friction-based devices to reduce vehicle speed may fade (i.e. provide reduced torque) when a temperature of the friction-based devices increases due to heat generated by the friction-base devices.

SUMMARY OF THE DISCLOSURE

According to a first aspect of the present disclosure, a vehicle includes a control system and a speed control system that is configured to increase speed of the vehicle and to decrease speed of the vehicle when a speed reduction command is received from the control system. The speed control system may include an engine that is capable of providing positive torque (i.e. torque tending to increase vehicle speed) and a friction-based system that generates negative torque (i.e. torque tending to decrease vehicle speed). The control system may be configured to provide speed reduction (negative torque) commands to the speed control system and to activate a friction-based speed reduction (negative torque) system of a trailer when the vehicle is towing a trailer having an active friction-based speed reduction (negative torque) system. A torque of the active friction-based speed reduction (negative torque) system of the trailer can be adjusted by changing a gain of the speed reduction (negative torque) commands to the trailer, and the controller may be configured to utilize a baseline gain if fade satisfying predefined criteria of the trailer friction-based speed reduction (negative torque) system is not detected. The control system may be configured to estimate a trailer negative torque originating from the active friction-based speed reduction (negative torque) system of a trailer when a speed control system command is provided to an active friction-based speed reduction (negative torque) system of a trailer at an applied gain. The control system may also be configured to decrease the gain of commands to the active friction-based speed reduction (negative torque) system of the trailer if the torque of the friction-based speed reduction (negative torque) system of the trailer for the applied gain is decreasing with time.

The controller may be configured to repeatedly reduce the gain of a speed reduction (negative torque) command to the active friction-based speed reduction system of the trailer until the gain of the speed reduction command is reduced to a predefined value.

The predefined value may comprise a predefined fraction of the baseline gain.

The controller may be configured to determine an expected torque of the trailer friction-based speed reduction system for the first gain, wherein the expected trailer torque corresponds to negative torque of the trailer friction-based speed reduction system when the active friction-based speed reduction system of the trailer is not experiencing fade.

The controller may be configured to increase the gain of a command to the active friction-based speed reduction system of the trailer if the controller determines that fade of the friction-based system of the trailer is no longer present.

The controller may be configured to repeatedly estimate a trailer torque after decreasing the gain of commands to determine if fade of the trailer friction-based system is occurring.

The controller may be configured to gradually increase the gain of a command to the active friction-based system of the trailer while continuing to estimate a trailer torque to determine if fade of the trailer friction-based system is occurring. The controller may be configured to stop increasing the gain of commands to the active friction-based system of the trailer if the controller determines that fade of the trailer friction-based system is occurring.

The controller may be configured to gradually increase the gain of a command to the active friction-based system of the trailer until the baseline gain is reached if fade of trailer friction-based system is not detected.

The controller may be configured to determine a minimum trailer gain that is less than the baseline gain. The controller may also be configured to limit reductions in trailer gain to the minimum trailer gain.

The controller may be configured to determine the minimum trailer gain based on a relationship between trailer gain and trailer fade.

The controller may be configured to select a minimum trailer gain that is not associated with trailer gain during prior operation of the motor vehicle while towing a trailer.

The controller may be configured to determine a plurality of minimum trailer gains for a plurality of vehicle operating conditions.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
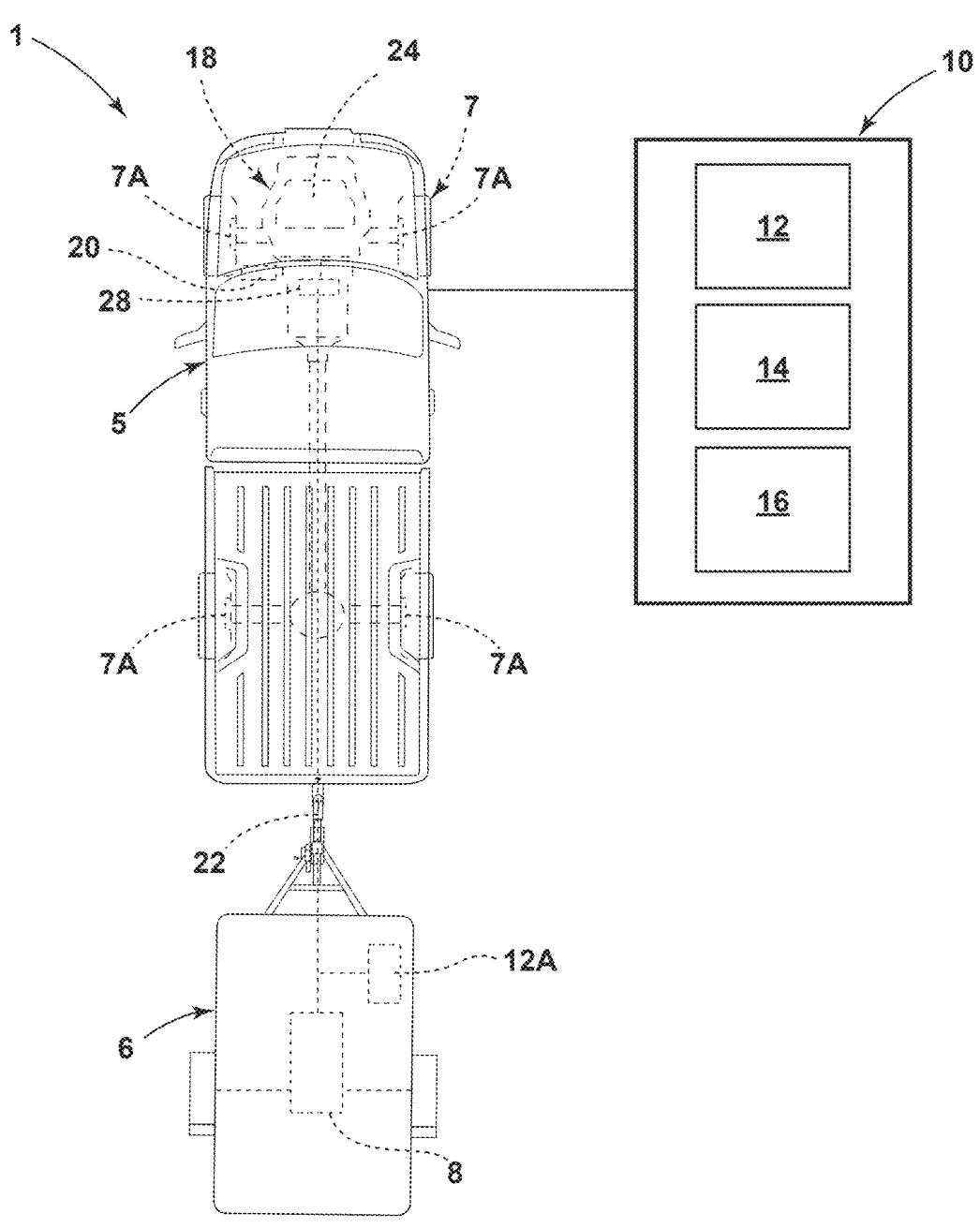
FIG. 1 is a partially schematic view of a vehicle and trailer according to an aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a device is described as containing components A, B, and/or C, the device can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to mean a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIG. 1, a vehicle system 1 may include a vehicle 5 that is configured to tow a trailer 6 having an active (e.g. powered) negative torque (speed reduction) (brake) system 8. Negative torque system 8 may comprise a friction-based system that, when actuated, creates a negative torque (i.e. a torque tending to reduce the speed of trailer 6). Trailer 6 may include sensors 12A that are operably connected to negative torque system 8. Vehicle 5 may include a controller or control system 10, which may include sensors 12, actuators 14, computing devices or systems and computing devices or systems 16. The control system 10 may be operably connected to a speed control system 18 of vehicle 5. Speed control system 18 may include a motor 24, which may be electric, internal combustion, or a combination thereof. Motor 24 may generate positive torque (i.e. torque tending to increase vehicle speed) and negative torque (i.e. torque tending to decrease vehicle speed). Speed control system 18 may further include a friction-based negative torque (speed reduction) (brake) system 7 having one or more friction-based devices 7A that generate negative torque when actuated. Vehicle 5 may further include user inputs 20, which may include one or more speed control pedals, a steering wheel, or the like. Vehicle 5 may further include a user input device 28. User input device 28 may comprise a touchscreen and/or a rotary knob that is configured to adjust speed reduction (negative torque) commands from controller 10 to active system 8 of trailer 6.

Control system 10 may be configured to send speed reduction (negative torque) signals or commands to the active trailer system 8 and the vehicle speed control system 18, whereby the active trailer system 8 and/or speed control system 18 generate negative torque that tends to reduce the speed of vehicle 5 and trailer 6 relative to a speed that would occur if no negative torque were generated by trailer system 8 and/or vehicle speed control system 18. The speed reduction (negative torque) signals may correspond to negative torque values that are expected to be produced by the trailer system 8 and/or vehicle speed control system 18, whereby the rate of change of speed of vehicle 5 and trailer 6 is equal to the expected speed reduction associated with the signals if the expected negative torque of trailer system 8 and vehicle system 18 are produced in response to the speed reduction (negative torque) commands. As discussed below, if negative torque commands to trailer system 8 and/or vehicle system 7 result in measured rates of reduction in speed that are less than the expected rate of reduction in speed, this may indicate that the trailer system 8 and/or vehicle system 7 are not providing the expected negative torque (e.g. the negative torque may be reduced due to fade). Thus, fade generally refers to a reduction in actual (measured) negative torque (e.g. due to heat) relative to an expected negative torque for a given negative torque (speed reduction) command.

A gain may be applied to one or both of the negative torque signals/commands to the trailer system 8 and/or speed control system 18 of vehicle 5 to increase the negative torque of trailer system 8 and/or speed control system 18 of vehicle 5. Thus, "vehicle gain" and "trailer gain" as used herein generally refer to adjustments to the magnitude of speed reduction (negative torque) commands/signals to the speed control system 18 of vehicle 5 and to trailer system 8, respectively.

Controller 10 may also be configured to provide active cruise control ("ACC") whereby sensors 12 (e.g. radar, lidar, or the like) detect vehicles in front of vehicle 5, and the ACC utilizes the sensor data to maintain a desired distance relative to other vehicles to thereby override a user-selected cruise control speed. The control system 10 may include various sensors to detect changes in speed of vehicle 5, whereby the controller 10 may be configured to utilize sensor data to control various vehicle operations. If trailer 6 includes sensors 12A, the sensors 12A may be operably connected to controller 10 to provide sensor data to controller 10. Vehicle 5 may incorporate one or more of the arrangements disclosed in, for example, Fraser et al. U.S. Pat. No. 10,065,641 issued Sep. 4, 2018, Hill et al. U.S. Pat. No. 10,479,334 issued Nov. 19, 2019, and James et al. U.S. Pat. No. 10,836,366 issued Nov. 17, 2020, the contents of each of which are incorporated herein by reference.

Figure 2A:
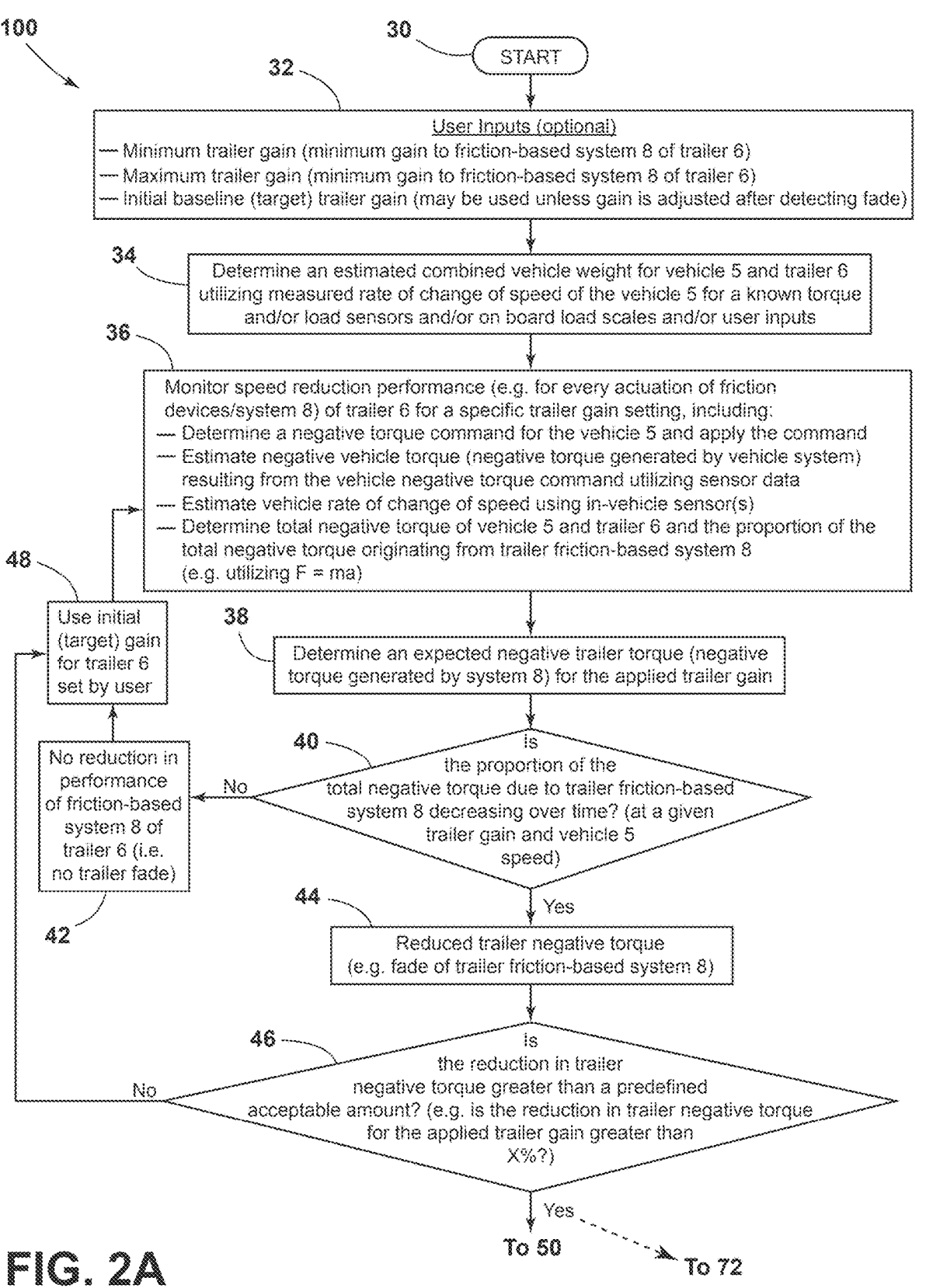
FIG. 2A is a first portion of a flow chart showing operation of a trailer fade recognition and mitigation control according to an aspect of the present disclosure.
Figure 2B:
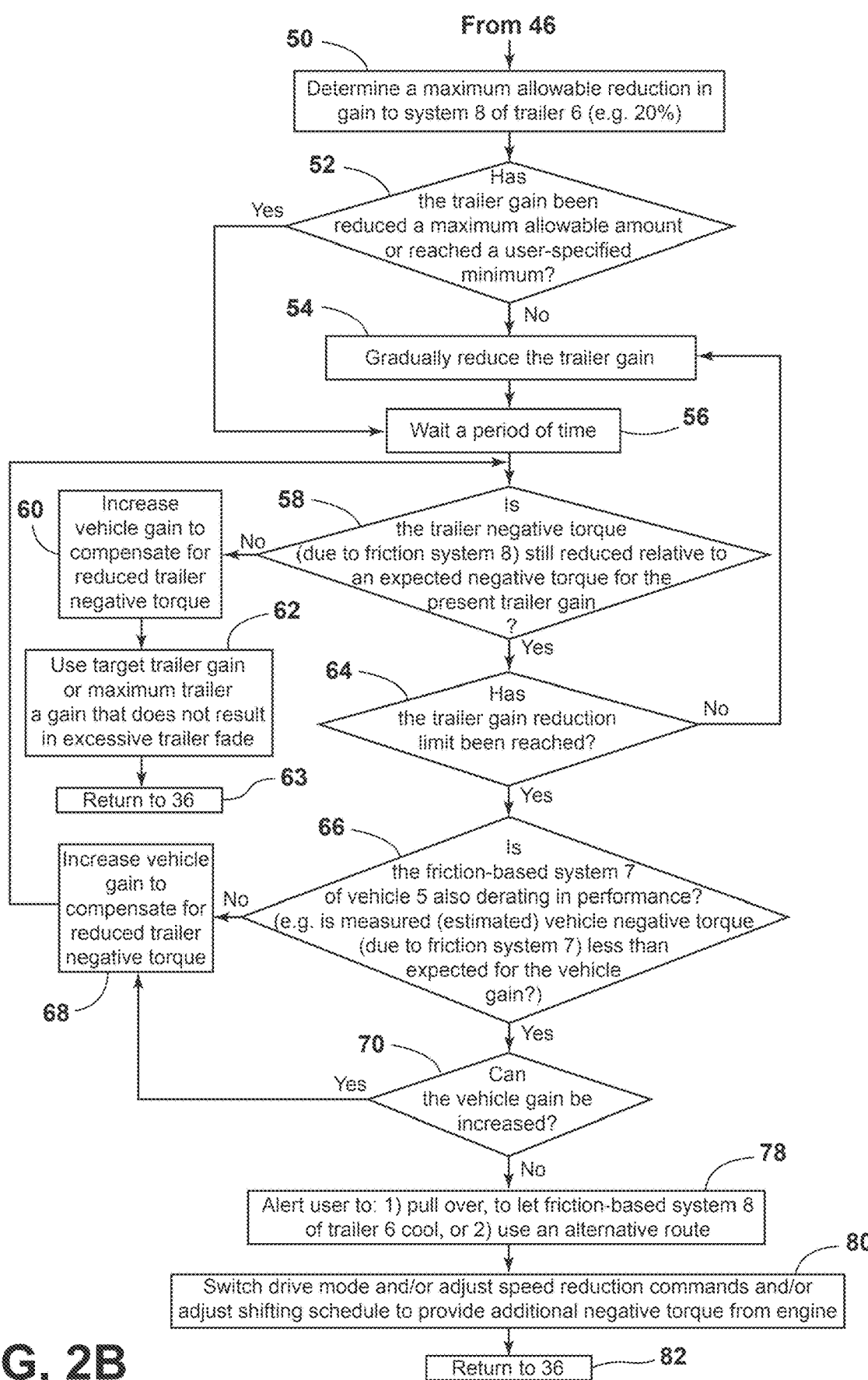
FIG. 2B is another portion of the flow chart of FIG. 2A.
Figure 2C:
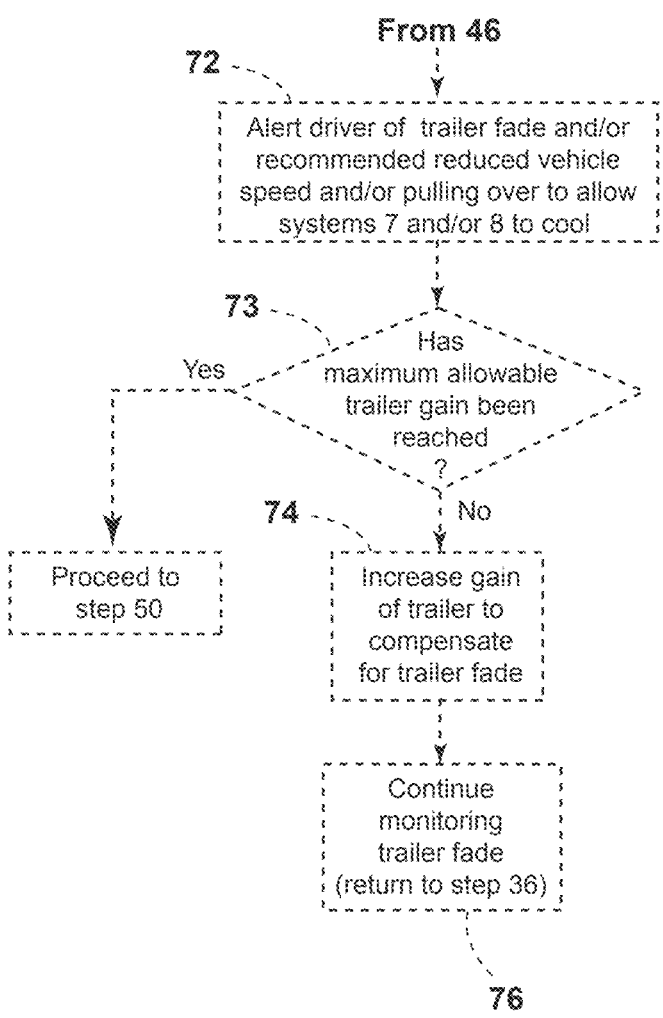
FIG. 2C is another portion of the flow chart of FIG. 2A.

With further reference to FIGS. 2A, 2B, and 2C, the control system (e.g. controller 10) of vehicle 5 may be configured to implement a process 100 whereby decreased reductions in vehicle speed due to reduced negative torque (i.e. reduced absolute value of negative torque) in the friction-based speed reduction system 7 of the vehicle 5 and/or system 8 of trailer 6 are detected. As discussed below, process 100 may also mitigate fade by reducing negative torque commands to friction-based system 8 of trailer 6. The reduction in negative torque may result from heating/fade of friction systems 26 and/or 8 of vehicle 5 and trailer 6, respectively. Speed reduction (negative torque) commands of controller 10 may be modified to mitigate the effects of fade of the friction-based system (5). For example, the system (e.g. controller 10) may be configured to reduce gain of the friction-based system 7 of the vehicle 5 and/or the friction-based system 8 of trailer 6 if fade is detected in one or both of systems 7, 8 to thereby allow the vehicle and/or trailer friction-based system(s) 7, 8 to cool until fade (reduction in torque) is no longer detected to thereby mitigate fade. The gain to systems 7 and/or 8 may then be increased to a baseline gain, or, alternatively, gain may be increased to a maximum gain that does not cause fade under the current operating conditions of the vehicle 5 and trailer 6. The fade detection and gain adjustments to the vehicle and/or trailer friction-based system(s) 7, 8 may be implemented while a user is operating the vehicle 5 with an adaptive cruise control (ACC) deactivated, and the fade detection and mitigation may also be implemented when ACC of vehicle 5 has been activated.

Referring again to FIG. 2A, after start 30, user inputs are supplied at step 32. The user inputs optionally include a minimum trailer gain and a maximum trailer gain. The minimum and maximum trailer gains are the minimum and maximum gains applied to negative torque commands from the controller 10 to the friction-based system/device 8 of trailer 6. The user inputs may also include an initial (baseline or target) gain. This gain target may be used by the system (controller 10) unless the gain is adjusted to account for/ mitigate fade of the friction-based system(s) 7, 8 of vehicle 5 and/or trailer 6.

At step 34, the system (e.g. controller 10) determines an estimated combined vehicle weight for the vehicle 5 and trailer 6. The combined vehicle weight may be estimated utilizing measured rates of change of vehicle speed for a known torque and/or utilizing load sensors and/or onboard load scales and/or user inputs. It will be understood that various approaches to estimating a combined vehicle weight are known, and a detailed description of combined weight estimation is therefore not believed to be necessary.

After the combined vehicle weight is estimated, the system 10 monitors the performance of the friction-based system(s) 7, 8 of vehicle 5 and/or trailer 6 at step 36. The performance for every requested speed reduction (negative torque) event may be monitored for a trailer 6 for a specific trailer gain setting. The performance monitoring may include determining a speed reduction (negative torque) command for the friction-based system 7 of vehicle 5 and/or system 8 of trailer 6, and the system 10 may apply (send) the speed reduction (negative torque) command to friction-based system 7 of vehicle 5 and/or to friction-based system 8 of trailer 6. The negative torque due to the command(s) may be estimated utilizing measured data from the vehicle speed control system 18. The changes in vehicle speed (e.g. rate of change of vehicle speed) may be measured (estimated) using in-vehicle sensors 12. For example, sensors 12 may be configured to measure vehicle speed (first derivative of position with respect to time), and/or rates of change of vehicle speed (second derivative of position with respect to time). The system 10 may be configured to determine the total force (negative torque) from systems 7 and 8 and the proportion of the total force (negative torque) originating from the friction-based system 8 of the trailer 6. This determination may utilize the estimated mass and measured rate of change in velocity in equations of the form F=ma. The system (e.g. controller 10) may then determine an expected trailer negative torque for the applied trailer gain at step 38.

At step 40 the system (e.g. controller 10) determines if the negative torque of the trailer friction-based system 8 has decreased (e.g. due to fade) compared to an expected negative torque (e.g. a negative torque when no fade is occurring). Step 40 may include determining if a proportion of the total negative torque due to the trailer friction-based system 8 is decreasing over time at a given trailer gain and vehicle speed. If the proportion of the total negative torque due to the trailer friction-based system 8 has not changed over time, this corresponds to no reduction in the performance of the trailer friction-based system 8 as shown at 42. If the performance of trailer friction-based system 8 has not been reduced, the process continues to step 48, and the initial or target gain is utilized, and negative torque performance is again monitored at step 36. However, if the proportion of the negative torque due to the trailer friction-based system 8 has decreased over time at step 40, this corresponds to reduced performance (negative torque having reduced absolute value) of friction-based system 8 of trailer 6 (step 44), and the process then continues to step 46. At step 46, the system determines if the reduction in negative torque from trailer friction-based system 8 is greater than a predefined acceptable amount.

In general, the limit for reduction in trailer negative torque performance may comprise a reduction in the absolute value of the negative torque that is greater than a preselected percentage of the trailer negative torque when the trailer negative torque is not reduced due to fade of the friction-based system 8 of trailer 6. If the reduction in trailer negative torque is within the acceptable percentage the process returns to step 48, and the initial (target) gain is used, and the negative torque performance of friction-based system 8 is monitored at 36. However, if the reduction in absolute value of negative torque at step 46 is greater than a predefined acceptable limit, the system continues to step 50 (or, optionally, step 72), and the system (e.g. controller 10) determines a maximum allowable reduction in gain in signals to the friction-based system 8 of trailer 6. The maximum allowable reduction in gain may comprise a percentage of the initial or baseline gain. It will be understood that the system may utilize a user-specified (input) minimum trailer or a maximum allowable reduction in gain as shown at step 50.

Rather than proceeding directly from step 46 to step 50, the process may optionally proceed from step 50 to steps 72, 73, 74, and 76 whereby the driver is optionally alerted of trailer fade at step 72, and the trailer gain may optionally be increased at step 74 if a maximum allowable trailer gain has not been reached at step 73. After increasing trailer gain at step 74, the process proceeds to step 76 and returns to step 36 whereby trailer fade is monitored. If a maximum allowable trailer gain has been reached at step 73, the process proceeds to step 50.

After step 50, the system then proceeds to step 52, and the system (e.g. controller 10) determines if the trailer gain has been reduced a maximum allowable amount and/or if it has reached a user-specified minimum trailer gain. If not, the system gradually reduces the trailer gain at 54, and waits a period of time at step 56. The period of time might be quite short (e.g. a few seconds) or longer (e.g. a few minutes). Thus, for example, trailer gain may be reduced 10% or 20% of the allowable reduction at step 54, and the system may then wait (not adjust gain) for 1 minute, 5 minutes, 10 minutes, 20 minutes, etc. before proceeding. It will be understood that virtually any gain adjustment amount and/or period of waiting to cool may be utilized, and the amounts and times noted above are merely examples. If the trailer gain has already been adjusted by a maximum allowable amount at step 52, the system proceeds directly from step 52 to step 56 without reducing the trailer gain at step 54.

After a period of time (step 56), the system proceeds to step 58, and determines if the magnitude (absolute value) of the trailer torque is still reduced relative to an expected torque for the present trailer gain (i.e. if absolute value of the negative torque generated by the friction-based system 8 of trailer 6 is reduced). If the trailer torque of system 8 is not reduced at step 58, the system (e.g. controller 10) proceeds to step 60, and gradually increases the trailer gain until the target gain is reached, and/or until fade of the friction-based system 8 of trailer 6 is detected. Thus, the increases in trailer gain may be discontinued if fade of the friction-based system 8 of trailer 6 is detected. It will be understood that either criteria may be utilized by itself to discontinue increases in trailer gain, or the system may be configured to utilize both criteria to discontinue increases in trailer gain. It will be understood that the system may store a plurality of gains that are associated with a plurality of vehicle operating conditions, wherein the stored gains correspond to maximum allowable gains that do not result in fade of the friction-based system 8 of trailer 6. Thus, step 60 may comprise increasing trailer gain until a maximum allowable stored gain that is not associated with fade of the friction-based system 8 of trailer 6 is reached.

After the trailer gain is increased at step 60, the system (e.g. controller 10) proceeds to step 62, and the system utilizes the target gain or the maximum trailer gain that does not result in excessive fade of the friction-based system 8 of trailer 6 (i.e. a gain that does not result in trailer fade in excess of a predefined allowable criteria), and the process then returns to step 36 at step 63.

If the magnitude of trailer torque is still reduced at step 58, the system (e.g. controller 10) proceeds to step 64, and the system determines if the trailer gain reduction limit has been reached. As discussed above, the trailer gain reduction limit may be determined at step 50. If the trailer gain reduction limit has not been reached at step 64, the process returns to step 54, and the trailer gain is gradually reduced. However, if the trailer gain reduction limit has been reached at step 64, the system proceeds to step 66. At step 66, the system determines if the vehicle friction-based system 7 is also derating in performance (e.g. due to fade of friction-based devices 7A of system 7 of vehicle 5). The system may determine if the vehicle friction-based system 7 is derating in performance by, for example, determining if the magnitude of the measured torque resulting from actuation of the vehicle friction-based system 7 is less than an expected vehicle torque (torque produced by the friction-based system 7 of vehicle 5) for the vehicle gain. It will be understood that a difference in measured vehicle torque may include a range, whereby some reduction in the absolute value of vehicle negative torque may be acceptable.

If the friction-based system 7 of the vehicle 5 is not derating in performance at step 66, the system proceeds to step 68, and the system increases vehicle gain to compensate for reduced trailer torque, and the system then returns to step 58.

If the friction-based system 7 of vehicle 5 is also derating in performance at step 66, the system continues to step 70, and the system determines if the vehicle gain can be increased. In general, the system (e.g. controller 10) may be configured to utilize a variety of factors in determining if the vehicle gain can be increased at step 50. For example, the system (e.g. controller 10) may take into account the vehicle speed, road conditions (e.g. slope, presence of rain or snow, etc.). If the vehicle gain can be increased at step 70, the system proceeds to step 68, and the vehicle gain is increased, and the system then proceeds to step 58. However, if the vehicle gain cannot be increased at step 70, the system proceeds to step 78. At step 78, the system (e.g. controller 10) alerts a user to pull over to let the friction-based device(s) 7A of system 7 cool, or to use an alternative route (e.g. a route having fewer hills or other conditions that are likely to require actuation of the friction-based system(s) of vehicle 5). The system then proceeds to step 80. Step 80 includes optional steps such as switching the driving mode and/or adjusting negative torque commands and/or changing a shifting schedule to provide additional negative torque from speed control system 18 of vehicle 5 (i.e. without increasing torque from system 7 of vehicle 5). In general, step 80 may include various changes in vehicle operation that may be implemented by the controller to reduce the torque required of the friction-based system 7 of vehicle 5 and/or the friction-based system 8 of trailer 6 to thereby mitigate the effects of fade and heating of the friction-based system 7 of vehicle 5 and/or system 8 of trailer 6. At step 82, the process returns to step 36.

In general, at steps 63, 76, and 82, the system may return to step 34 instead of returning to step 36. For example, the process may always return to step 34 at steps 63, 76, and 82, or the process may optionally include determining if sensor data or other circumstances exist that indicate a change in combined weight may have occurred. Also, the process may return to step 30 ("start") if the vehicle ignition is cycled off, a trailer has been disconnected and reconnected (which may indicate that a different trailer has been connected to the vehicle), or other predefined "start" criteria are determined to exist.

Thus, in order to mitigate or reverse the effects of fade, vehicle 5 may gradually reduce the trailer gain, wait a period of time, and then reevaluate the trailer negative torque-togain relationship. The system (e.g. controller 10) may be configured to not allow the trailer gain to be decreased below the driver-specified minimum trailer gain. The process can be repeated multiple times until the trailer gain is reduced to an acceptable value, or the trailer gain is reduced to a minimum value as determined via calibration. For example, one criteria may specify that trailer gain can only be reduced to a maximum of X % where X could be 20%. If the friction-based system 7 of vehicle 5 is also derating in performance, or is close to derating as determined via vehicle performance (e.g. rates of reduction in speed) and/or thermal models of friction-based devices 7A of vehicle 5 utilized by controller 10, then the trailer gain will not be reduced because the vehicle 5 cannot compensate adequately for reduced torque from trailer 6.

Preferably, as the gain for the signals to system 8 of trailer 6 is reduced, the trailer friction-based system 8 will cool, and the expected trailer gain versus trailer torque relationship will be restored. Once the gain/torque relationship is restored, the vehicle 5 and trailer 6 can maintain this trailer gain level for a period of time to let the temperature of the friction-based system 8 of trailer 6 stabilize, and then the trailer gain can be increased to a higher value whereby the system can determine an optimal (most aggressive) value for trailer gain without causing thermal derating of the friction-based system 7 of vehicle 5 and/or system 8 of trailer 6. Once a higher gain value is obtained, the gain to torque relationship can be continually reevaluated by the control system 10. If the expected gain to torque relationship holds constant (or approximately), control system 10 of vehicle 5 can continue to slowly increase the trailer gain. This process may continue until the trailer friction-based system 8 is at an initial trailer gain level, or until the vehicle control 10 determines a more thermally suitable trailer gain level that will prevent fade of the trailer friction-based system 8. The vehicle and/or trailer gain settings can be stored and used by control system 10 when similar vehicle operating conditions are sensed to be present. The vehicle and/or trailer gain settings may also be route specific to, example, long downhill roads causing fade of vehicle system 7 and/or system 8 of trailer 6 when aggressive gain is utilized, whereas the same aggressive gain may not cause fade when traversing routes that do not include long downhill sections.

As the control system of vehicle 5 re-biases negative torque from the trailer 6 to the vehicle 5, the vehicle 5 may utilize thermal models stored in control system 10 to predict fade of the friction-based system 7 of vehicle 5 and/or fade of friction-based system 8 of trailer 6. If the thermal models indicate that the friction-based system 7 of vehicle 5 are getting hot (or likely getting hot), the vehicle 5 may then provide an alert to the user to pull over and wait for the friction-based system 7 to cool down. Alternatively, the vehicle 5 may alert the driver to take an alternative route. As discussed above in connection with FIG. 2, this may also include switching drive modes and/or changing the shifting schedule to utilize more engine and/or shifting-based vehicle negative torque instead of friction-based negative torque from system 7 of vehicle 5 and/or system 8 of trailer 6.

If the speed reduction performance of trailer 6 is not satisfactory after an initial derate (fade) event and for subsequent runs, the vehicle 5 may alert the driver to service the friction-based system 8 of trailer 6. Also, if the friction-based system 8 of trailer 6 is not properly contributing to reductions in speed, vehicle speed may be limited and/or negative engine torque (e.g. vehicle regenerative torque) may be increased to contribute to changes (e.g. reductions) in speed. In situations in which the friction-based system 7 of vehicle 5 and/or system 8 of trailer 6 experience elevated temperatures causing fade, the navigation system of vehicle 5 may re-route the vehicle 5 so that downhill grades, stop and go traffic, or the like are not encountered. The navigation system may be configured to leverage uphill or flat roadways with as consistent as possible speeds, including leveraging crowd sourced/topography/map and roadway speed data to optimize route selection for optimal cooling of the friction-based system 7 of vehicle 5 and/or system 8 of trailer 6.

Such operations described herein should always be implemented and/or performed in accordance with the vehicle owner guides.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a control system;

a speed control system that is configured to increase vehicle speed when a positive torque command is received from the control system and to decrease vehicle speed when a negative torque command is received from the control system;

wherein the control system is configured to:

1) provide negative torque commands to the speed control system and to activate an active friction-based negative torque system of a trailer being towed by the vehicle by providing negative torque commands to the trailer whereby the active friction-based negative torque system of the trailer generates a negative trailer torque that tends to reduce a speed of the trailer, wherein a magnitude of the negative trailer torque can be adjusted by changing a gain of the negative torque commands to the trailer, and wherein the controller is configured to utilize a baseline gain if a predefined degree of fade of the active friction-based negative torque system of the trailer is not detected;

2) estimate a trailer negative torque originating from the active friction-based negative torque system of the trailer when a negative torque command is provided to the trailer at an applied gain;

3) determine that the predefined degree of fade of the active friction-based negative torque system of the trailer has occurred if the negative trailer torque for the applied gain is decreasing with time according to predefined criteria;

4) decrease the gain of negative torque commands to the trailer if trailer negative torque for the applied gain is decreasing with time according to predefined criteria; and 5) repeatedly estimate a trailer negative torque after decreasing the gain of negative torque commands to determine if fade of the active friction-based negative torque system of the trailer is occurring.

2. The vehicle of claim 1, wherein:

the controller is configured to repeatedly reduce the gain of negative torque commands to the trailer until the gain of a negative torque command to the trailer is reduced to a predefined value.

3. The vehicle of claim 2, wherein:

the predefined value comprises a predefined fraction of the baseline gain.

4. The vehicle of claim 1, wherein:

the controller is configured to determine an expected trailer negative torque for the first gain, wherein the expected trailer negative torque corresponds to trailer negative torque when the active friction-based negative torque system of the trailer is not experiencing fade.

5. The vehicle of claim 1, wherein:

the controller is configured to increase the gain of a negative torque commands to the trailer if the controller determines that fade of the active friction-based negative torque system of the trailer is no longer present.

6. The vehicle of claim 1, wherein:

the controller is configured to gradually increase the gain of negative torque commands to the trailer while continuing to estimate a trailer negative torque to determine if fade of the friction-based negative torque system of the trailer is occurring; and the controller is configured to stop increasing the gain of negative torque commands to the trailer if the controller determines that fade of the active friction-based negative torque system of the trailer is occurring.

7. The vehicle of claim 6, wherein:

the controller is configured to gradually increase the gain of negative torque commands to the trailer until the baseline gain is reached if fade of the active friction-based negative torque system of the trailer is not detected.

8. The vehicle of claim 6, wherein:

the controller is configured to determine a minimum trailer negative torque gain that is less than the baseline gain; and the controller is configured to limit reductions in gain to the minimum trailer negative torque gain of negative torque commands to the trailer.

9. The vehicle of claim 8, wherein:

the controller is configured to determine the minimum gain of negative torque commands to the trailer based on a relationship between gain of negative torque commands to the trailer and fade of the active friction-based negative torque system of the trailer.

10. The vehicle of claim 9, wherein:

the controller is configured to select a minimum trailer gain, wherein the minimum trailer gain is not associated with fade of the active friction-based negative torque system of the trailer during prior operation of the motor vehicle while towing a trailer.

11. The vehicle of claim 10, wherein:

the controller is configured to determine a plurality of minimum trailer negative torque gains of negative torque commands to the trailer for a plurality of vehicle operation conditions.

12. A method of controlling a vehicle while the vehicle is towing a trailer having an active friction-based negative torque system that can be actuated to provide a negative torque that tends to reduce vehicle speed, the method comprising:

providing negative torque commands to the trailer being towed by the vehicle to activate the friction-based negative torque system of the trailer;

estimating a trailer negative torque originating from the active friction-based negative torque system of the trailer when a negative torque command is provided to the trailer at an applied gain:

wherein estimating trailer negative torque is based, at least in part, on an estimated combined weight of the vehicle and trailer, a rate of change of the vehicle speed when a negative torque command is provided to the trailer at the applied gain, and an estimated vehicle negative torque, utilizing an equation of the form $F=ma$;

determining that fade of the friction-based negative torque system of the trailer has occurred if the negative torque of the friction-based negative torque trailer for the applied gain is decreasing with time;

decreasing the gain of negative torque commands to the trailer if the trailer negative torque for the applied gain is decreasing with time;

increasing the gain of a negative torque command to the trailer if trailer fade is no longer present; and repeatedly estimating a trailer negative torque after decreasing the gain of negative torque commands to determine if fade of the friction-based negative torque system of the trailer is occurring.

13. The method of claim 12, including:

repeatedly reducing the gain of a negative torque command to the trailer until the gain of a negative torque command to the trailer is reduced to a predefined value.

14. The method of claim 12, including:

determining an expected trailer negative torque for a first gain, wherein the expected trailer negative torque comprises trailer negative torque when the active friction-based negative torque system of the trailer is not experiencing fade.

15. The method of claim 12, including:

gradually increasing the gain of negative torque commands to the trailer while continuing to estimate a trailer negative torque to determine if fade of the friction-based negative torque system of the trailer is occurring; and discontinuing increasing the gain of negative torque commands to the trailer if fade of the friction-based negative torque system of the trailer is occurring.

16. A method of mitigating fade of a friction-based negative torque system of a trailer, the method comprising:

reducing negative torque commands to the friction-based negative torque system of the trailer if fade is detected to allow the friction-based negative torque system of the trailer to cool;

followed by increasing negative torque commands to the friction-based negative torque system of the trailer after fade has been reduced;

determining if fade of the friction-based negative torque system of the trailer is decreasing compared to an expected negative torque of the friction-based negative torque system of the trailer; and limiting reductions in negative torque commands to the trailer based on predefined criteria.

* * * * *